Figure 1:
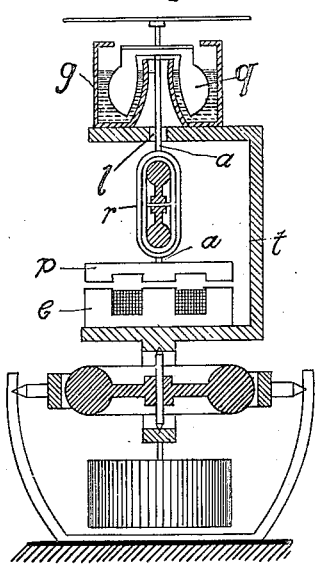

T. BRUGER.
GYROSCOPE COMPASS.
APPLICATION FILED OCT. 26, 1910.

1,074,771.

Patented Oct. 7, 1913.

WITNESSES
R. C. Braddock.
Emory L. Groff.

INVENTOR
THEODOR BRUGER
By
His Attorney

UNITED STATES PATENT OFFICE.

THEODOR BRUGER, OF FRANKFORT-ON-THE-MAIN, GERMANY, ASSIGNOR TO THE FIRM OF HARTMANN & BRAUN A. G., OF FRANKFORT-ON-THE-MAIN, GERMANY.

GYROSCOPE-COMPASS.

1,074,771.    Specification of Letters Patent.    Patented Oct. 7, 1913.

Application filed October 26, 1910. Serial No. 589,269.

*To all whom it may concern:*

Be it known that I, THEODOR BRUGER, a citizen of the German Empire, and a resident of Frankfort-on-the-Main, Germany, have invented certain new and useful Improvements in and Relating to Gyroscope-Compasses.

A gyroscope intended for employment as a course indicator and constructed with a Foucault tendency the effect of which is to maintain a constant parallel position in relation to and turning in the same sense as the earth's axis, is, when used on ship board so influenced by variation in the speed and in the direction of the vessel, that a deviation in the vertical axis results; and hitherto in order to reduce this disturbance to a practically permissible quantity, gyroscopes having very great periods of oscillation in the vertical axis have had to be employed.

The present invention relates essentially to gyroscope-compasses with Foucault tendency designed to secure a short period of oscillation concurrently with a reduction in the deviation due to the disturbing influences before referred to. It is known that in an undamped gyroscope-compass the period of oscillation to its vertical axis is, with a somewhat large moment of inertia in the essential proportion $$\sqrt{\frac{\Theta o}{mga}}$$

in which $\Theta o$ indicates the moment of inertia, $m$ the total mass, $a$ the distance of the center of gravity from the point of support and $g$ the acceleration by gravity. On the other hand, the extent of a deviation due to a disturbance, caused by an acceleration $\gamma$ in the ship's speed is proportional to $$\gamma \sqrt{\frac{ma}{g\Theta o}}.$$

From these two formulæ for the period of oscillation and for the deviation due to a disturbance, it results that by a reduction of $m$ and $a$ or by an increase of $\Theta o$, the deviation due to a disturbance declines, while the period of oscillation increases. It is moreover obvious that by only increasing the value of $g$ the degree of disturbance as well as the period of oscillation can be reduced. Now, it is not possible, according to the laws of nature, to increase the acceleration due to the gravity; but one can very well add to the force of gravity a further field, which, without influencing the free revolution of the gyroscope about its vertical axis, acts in the same manner as an increase of $g$, as it meets the requirement of reducing the period of oscillation and at the same time the deviation due to a disturbance. The employment of such an additional field of force forms the essential subject of the present invention, which is distinguished essentially from other known devices designed with the object of damping the oscillation of the compass by special torques.

Figure 1 shows diagrammatically and by way of example a constructional form with an electromagnetic auxiliary field. The gyroscope consists of the massive disk $m$, which is mounted to revolve freely in the rim $r$ and is driven electrically, for example, by multiphase current. The rim $r$ is connected with the vertical axis $a$, in order that it may freely revolve in its bearing $l$, and is supported by a float $q$, which in the present illustration dips into a reservoir of mercury $g$. Below the rim $r$ is contrived the auxiliary field of force, which is here supplied by a direct or alternating current electromagnet $e$ constantly in circuit, and acts upon the armature $p$ fixed at $a$, a certain distance above its poles; the magnet being constructed in pot-form, so as to offer practically no resistance to the turning of its armature with the axis $a$. It is necessary to protect this electromagnet against the effect of the pitching and rolling movements of the ship; and in this connection the customary devices serve. For instance, either the whole supporting frame $t$ or the part on which the electromagnet $e$ is fixed, can be suspended à la Cardan: or this part can be supported on a plate which is continually kept horizontal by a special gyroscope-system as is shown diagrammatically in Fig. 1. In order to avoid, when the supporting base connected to the ship turns, the gyroscope-compass under the influence of small forces, such as remanent magnetism, participating to a slight extent in the turning movement of the ship, there is introduced another contrivance, which, as soon as the ship turns to a certain angle, has the effect of turning the supporting base of the gyroscope respectively that of the magnet through the same angle but in the opposite direction so that the position of the magnet relatively to its armature is always the same. Such a correcting or compensating appliance may comprise an appliance of the character described and illustrated in the U. S. Patent to Narciss Ach, No. 875,036, dated December 31, 1907. It is not necessary that the additional field of force should operate in the exact direction of the force of gravity perpendicularly downward. It need only be continually effective in the sense that the period of oscillation, as also any possible deviation of the gyroscope should be reduced; and for this purpose suffices every field of force orientated symmetrically in relation to the vertical line situated through the point of suspension of the gyroscope, which tends to reduce the angle by which the vertical axis of the gyroscope by the rotation of the same, deviates from the true vertical direction, and the effect of which increases likewise with the increase of this angle, commencing from O. The greater one makes the effect of this additional field, which is independent of the mass of the gyroscope against the product $mga$, the more completely is the object in question attained, and it does not appear to be impossible to construct in this manner a gyroscope-compass practically free from deviations due to disturbances and at the same time of a moderate period of oscillation.

Figure 2:
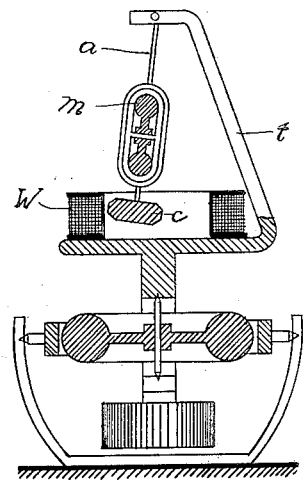

Fig. 2 shows a constructional form in which the additional field of force is supplied by an alternating current solenoid $w$, which operates repellantly on the metallic mass $c$ connected to the vertical axis $a$ of the gyroscope-compass, in such a way that it seeks to push the same into its vertical or central axis, where the flux of force is at a minimum. The field strength in the solenoid increases from the center toward the sides symmetrically on all sides; and in consequence hereof the repelling force becomes so much the stronger the farther the gyroscope axis is diverted from the vertical, if beforehand, the gyroscope has been so orientated that its vertical axis coincides with the vertical axis of the solenoid. Obviously the solenoid can also in this case be armed with iron; or be replaced by one or several alternating current electromagnets of similar effect. It must, however, be so contrived, that it is not influenced by alterations of the ship's position, and it can, for instance, be supported on a base horizontalized by a further gyroscope system or by a suspension of the "Cardan" type connected with the rim of the gyroscope.

Figure 3:
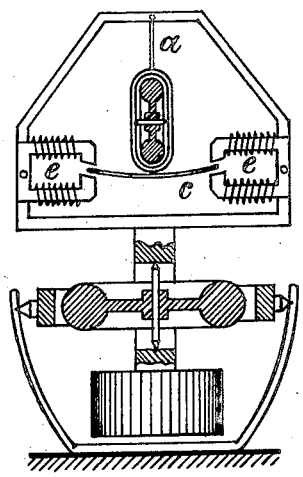

In Fig. 3 is illustrated a special construction of the device wherein the vertical gyroscope axis $a$ supports a copper-plate piece C, which lies within the control of several alternating current electromagnets $e$. These operate repellantly on the plate piece with a force which increases the farther the plate piece comes into the field in question; so that upon the position of the axis $a$ becoming oblique they aim to restore the latter to the vertical position. If only two electromagnets are used, these must be placed opposite one another in the direction of the gyroscope-axis, and must be kept in this position in relation to the gyroscope by a corresponding connection; as for example by a correcting or compensating appliance of the character already described or by a suspension of the "Cardan" type connected with the rim of the gyroscope.

Figure 4:
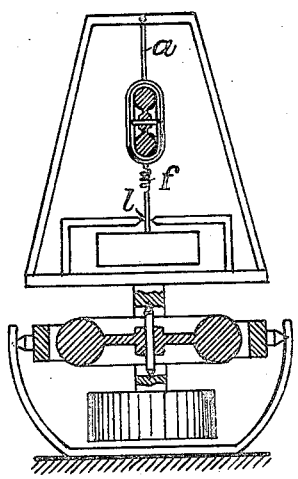

Another example of a constructional form is shown in Fig. 4, wherein an effect similar to that in Figs. 2 and 3 is attained by an elastic force. On the horizontally supported base plate is mounted a bearing $l$, in which the vertical axis $a$ of the gyroscope when in repose, can turn quite freely and practically without friction; while as soon as the gyroscope-axis manifests a deviation resulting from any disturbing influence, this axis, which is made elastically flexible by the introduction of a spiral spring $f$, becomes subject to a pressure from the bearing which tends to restore it to the vertical position. A heavy mass brought into direct proximity to the axis of the gyroscope serves likewise to reduce the period of oscillation but cannot in consequence of its position directly below or above the bearing $l$ give occasion to any disturbance due to an alteration in the speed of the ship. It will also be apparent that one can reverse the character of the mounting as shown by arranging the vertical axis of the gyroscope rigidly and the bearing $l$ elastically.

Figure 5:
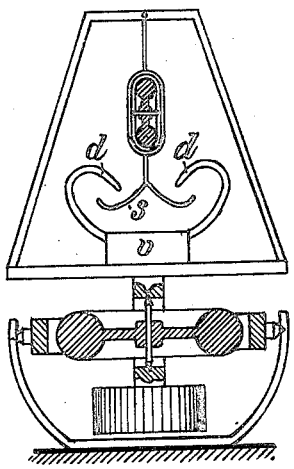

According to a further alternative method of construction compressed air is used for producing the additional force, the air jets being directed symmetrically to the vertical axis against a bowl connected thereto. Fig. 5 shows diagrammatically a contrivance of this nature, the compressed air being supplied by a blower $v$ which rests on the horizontal base plate and being forced through tubes $d$, arranged circularly in relation to the bowl $s$ connected with the vertical axis of the gyroscope-compass.

As hereinbefore indicated, disturbances which might influence the effectiveness of the auxiliary field, or auxiliary correcting device, cannot occur owing to the arrangement of special contrivances. The same comprise either a Cardan suspension which keeps the support of the gyroscope, as well as the auxiliary field in vertical position without regard to the rolling and pitching movements of the vessel, or of a second gyroscope, as illustrated in the drawings. This auxiliary gyroscope is supported in such a manner that the supporting plate to which it is connected always retains its horizontal position in spite of the ship's movements. Furthermore, a correcting or compensating device is provided and has the effect of rendering the gyroscope compass and its support independent of the disturbances due to variations of the ship's course. This correcting device may preferably be of the type described in the U. S. patent aforesaid.

Having now particularly described and ascertained the nature of my said invention and in what manner the same is to be performed, I claim:

1. A gyroscope compass of the character described comprising a base, means for supporting the base in a horizontal position, a gyroscopic member, means for supporting the said gyroscopic member over and from the base, so that it can swing laterally with respect to the base, and an auxiliary device carried by the base and arranged to supplement the force of gravity in its influence upon the gyroscopic member.

2. A gyroscopic compass of the character described, comprising a base, means for supporting the base in a horizontal position, a gyroscopic member, means for loosely suspending the said gyroscopic member from the base in a position over the latter, and an auxiliary device carried by the base and arranged to supplement the force of gravity in its influence upon the gyroscopic member.

3. A gyroscopic compass of the character described including a base, means for supporting the base in a horizontal position, a gyroscopic member, float-suspension means for supporting the said gyroscopic member from and over the base, and an auxiliary correcting device including an electromagnet and movable armature, respectively, carried by the base and gyroscopic member.

4. A gyroscopic compass of the character described comprising a base having a Cardan suspension, a gyroscopic member arranged above the base and mounted to swing laterally with respect to the base, an auxiliary correcting device carried by the base and supplementing the force of gravity in its influence upon the gyroscopic member.

5. A gyroscopic compass of the character described comprising a gyroscopic member suspended so as to swing laterally, and an auxiliary correcting device supplying an auxiliary field of force supplementing the force of gravity, and so adjusted as to outweigh the effect of gravity, and substantially control the action of the gyroscope.

In testimony whereof I have affixed my signature in presence of two witnesses.

THEODOR BRUGER.

Witnesses:
 JEAN GRUND,
 CARL GRUND.